US007097561B2

(12) United States Patent
Lark

(10) Patent No.: US 7,097,561 B2
(45) Date of Patent: Aug. 29, 2006

(54) GAMING APPARATUS WITH NOVEL DISPLAY TECHNIQUE

(75) Inventor: David Lark, Reno, NV (US)

(73) Assignee: IGT, Reno, NV (US)

( * ) Notice: Subject to any disclaimer, the term of this patent is extended or adjusted under 35 U.S.C. 154(b) by 219 days.

(21) Appl. No.: 09/966,479

(22) Filed: Sep. 28, 2001

(65) Prior Publication Data

US 2003/0096644 A1 May 22, 2003

(51) Int. Cl.
*A63F 13/00* (2006.01)

(52) U.S. Cl. ............................ 463/31; 463/30; 463/16; 463/17; 463/18; 463/19; 463/20; 463/21

(58) Field of Classification Search ............ 463/16–21, 463/22, 25, 30–33; 273/148 R, 138.1, 138.2, 273/139

See application file for complete search history.

(56) References Cited

U.S. PATENT DOCUMENTS

| | | | | |
|---|---|---|---|---|
| 4,455,025 | A | 6/1984 | Itkis | 273/237 |
| 4,517,654 | A * | 5/1985 | Carmean | 345/636 |
| 4,635,937 | A | 1/1987 | Dickinson et al. | 273/143 |
| 4,711,451 | A | 12/1987 | Pajak et al. | 273/143 |
| 4,760,527 | A | 7/1988 | Sidley | 364/412 |
| 4,804,185 | A * | 2/1989 | Noble et al. | 463/11 |
| 4,837,728 | A | 6/1989 | Barrie et al. | 364/412 |
| 4,856,787 | A | 8/1989 | Itkis | 273/239 |
| 5,154,429 | A | 10/1992 | LeVasseur | 273/292 |
| 5,192,076 | A | 3/1993 | Komori | 273/138 |
| 5,393,061 | A * | 2/1995 | Manship et al. | 463/20 |
| 5,411,271 | A * | 5/1995 | Mirando | 463/9 |
| 5,605,504 | A * | 2/1997 | Huang | 463/22 |
| 5,674,128 | A * | 10/1997 | Holch et al. | 463/42 |
| D395,463 | S * | 6/1998 | Scott et al. | D21/371 |
| 5,823,873 | A | 10/1998 | Moody | 463/13 |
| 5,823,874 | A * | 10/1998 | Adams | 463/17 |
| 5,957,774 | A * | 9/1999 | Holmes et al. | 463/13 |
| 6,015,346 | A * | 1/2000 | Bennett | 463/20 |
| 6,089,976 | A * | 7/2000 | Schneider et al. | 463/16 |
| 6,104,815 | A * | 8/2000 | Alcorn et al. | 380/251 |
| 6,135,884 | A * | 10/2000 | Hedrick et al. | 463/20 |
| 6,146,273 | A * | 11/2000 | Olsen | 463/27 |
| 6,159,095 | A * | 12/2000 | Frohm et al. | 463/19 |
| 6,174,234 | B1 * | 1/2001 | Seibert et al. | 463/20 |
| 6,241,607 | B1 * | 6/2001 | Payne et al. | 463/20 |

(Continued)

OTHER PUBLICATIONS

IGT 2001 Annual Report, pp. 38-41.*

(Continued)

*Primary Examiner*—John Hotaling
*Assistant Examiner*—Ross A. Williams
(74) *Attorney, Agent, or Firm*—Marshall, Gerstein & Borun LLP

(57) ABSTRACT

A gaming apparatus may include a cabinet having a front face, a gaming display supported inside the cabinet and positioned adjacent the cabinet front face, the gaming display being operable to generate images and a controller operatively coupled to the gaming display. The controller may comprise a processor and a memory operatively coupled to the processor. The controller may be programmed to allow a person to make a wager, cause an image associated with a game to be generated on the gaming display, to determine an outcome of the game represented by the image and to determine a value payout associated with the outcome of the game. The controller also may be programmed to display on the gaming display a plurality of display elements which change from displaying cards to displaying portions of a first display object wherein the portions of the first display object create an identifiable image.

24 Claims, 18 Drawing Sheets

U.S. PATENT DOCUMENTS 6,261,177 B1 * 7/2001 Bennett ........................ 463/16
6,287,202 B1 * 9/2001 Pascal et al. ................. 463/42
6,309,300 B1 * 10/2001 Glavich ........................ 463/26
6,347,996 B1 * 2/2002 Gilmore et al. ............... 463/17
6,398,644 B1 * 6/2002 Perrie et al. .................. 463/18
6,533,273 B1 * 3/2003 Cole et al. ............... 273/138.1
6,645,074 B1 * 11/2003 Thomas et al. ............... 463/20
2002/0160826 A1 * 10/2002 Gomez et al. ................ 463/16

OTHER PUBLICATIONS

Odyssey Gaming Machine Brochure, Silicon Gaming, Inc. circa Oct. 1997.*

* cited by examiner

GAMING APPARATUS WITH NOVEL DISPLAY TECHNIQUE

BACKGROUND OF THE INVENTION

This invention relates to a gaming apparatus for playing games such as slots, poker, keno, bingo and blackjack. Conventional gaming units are typically provided with a cabinet and a gaming display mounted inside the cabinet. The gaming display may be mechanical, such as a series of stepper wheels, or may be electronic such as a video display that is capable of generating video images. Whether mechanical or electronic, the gaming display may be capable of generating images associated with a game, such as poker, blackjack, slots, keno, or bingo.

While the gaming display is the primary functional component, many gaming units include one or more design or stylistic elements to attract a player's attention to the gaming unit. Design elements also can be incorporated into the gaming display. In addition to attracting the player's attention, many gaming units incorporate additional stylistic or functional elements to keep the player's attention as long as possible by increasing the play value of the gaming unit. For example, a gaming unit may have a special or bonus mode that is triggered as a result of a certain outcome of the game. During the bonus mode, the gaming unit may run a different game or provide increased value payouts, thereby enhancing the play value. During an attract mode, interesting images may be displayed to attract users. Overall, it is important to adequately attract and maintain player interest in the games.

SUMMARY OF THE INVENTION

The invention is directed to a gaming apparatus which may include a cabinet with a front face, a gaming display supported inside the cabinet and positioned adjacent the cabinet front face so that the gaming display is viewable, the gaming display being operable to generate images and a controller operatively coupled to the gaming display. The controller may comprise a processor and a memory operatively coupled to the processor. The controller may be programmed to allow a person to make a wager, cause an image associated with a game to be generated on the gaming display, to determine an outcome of the game represented by the image and to determine a value payout associated with the outcome of the game. The controller also may be programmed to display on the gaming display a plurality of display elements which change from displaying portions of a first object to displaying a second display object. The game may be video poker, video slots, video blackjack, video keno or video bingo. The display element may be virtual playing cards, virtual keno number spaces or virtual bingo spaces.

The invention also is directed to a method to display images on a gaming device, which may sense for a triggering event, display a plurality of display elements which are portions of a first display object and progressively change the display elements from displaying the portion of the first display object to display a second display object wherein the portions of the first display object create a visually identifiable first display object. The game may be video poker, video slots, video blackjack, video keno or video bingo. The display element may be virtual playing cards, virtual keno number spaces or virtual bingo spaces.

In addition, the invention may be directed to a programmed memory that is capable of being used in connection with an electronic gaming apparatus that allows a person to play a game, that dispenses value to the person at the conclusion of the game, and that may have a processor, an input device, and a currency accepting mechanism. The programmed memory may have a first memory portion physically configured in accordance with computer program instructions that may cause the electronic gaming apparatus to allow a person to sense for a triggering event if the programmed memory were incorporated into the electronic gaming apparatus, a second memory portion physically configured in accordance with computer program instructions that may cause the electronic gaming apparatus to allow the person to display a plurality of display elements which are portions of a first display object if the programmed memory were incorporated into the electronic gaming apparatus and a third memory portion physically configured in accordance with computer program instructions that may cause the electronic gaming apparatus to progressively changing the display elements from displaying the portion of the first display object to display a second display object wherein the portions of the first display object may create a visually identifiable first display object if the programmed memory were incorporated into the electronic gaming apparatus.

The features and advantages of the present invention will be apparent to those of ordinary skill in the art in view of the detailed description of various embodiments, which is made with reference to the drawings, a brief description of which is provided below.

DETAILED DESCRIPTION OF VARIOUS EMBODIMENTS

Figure 1:
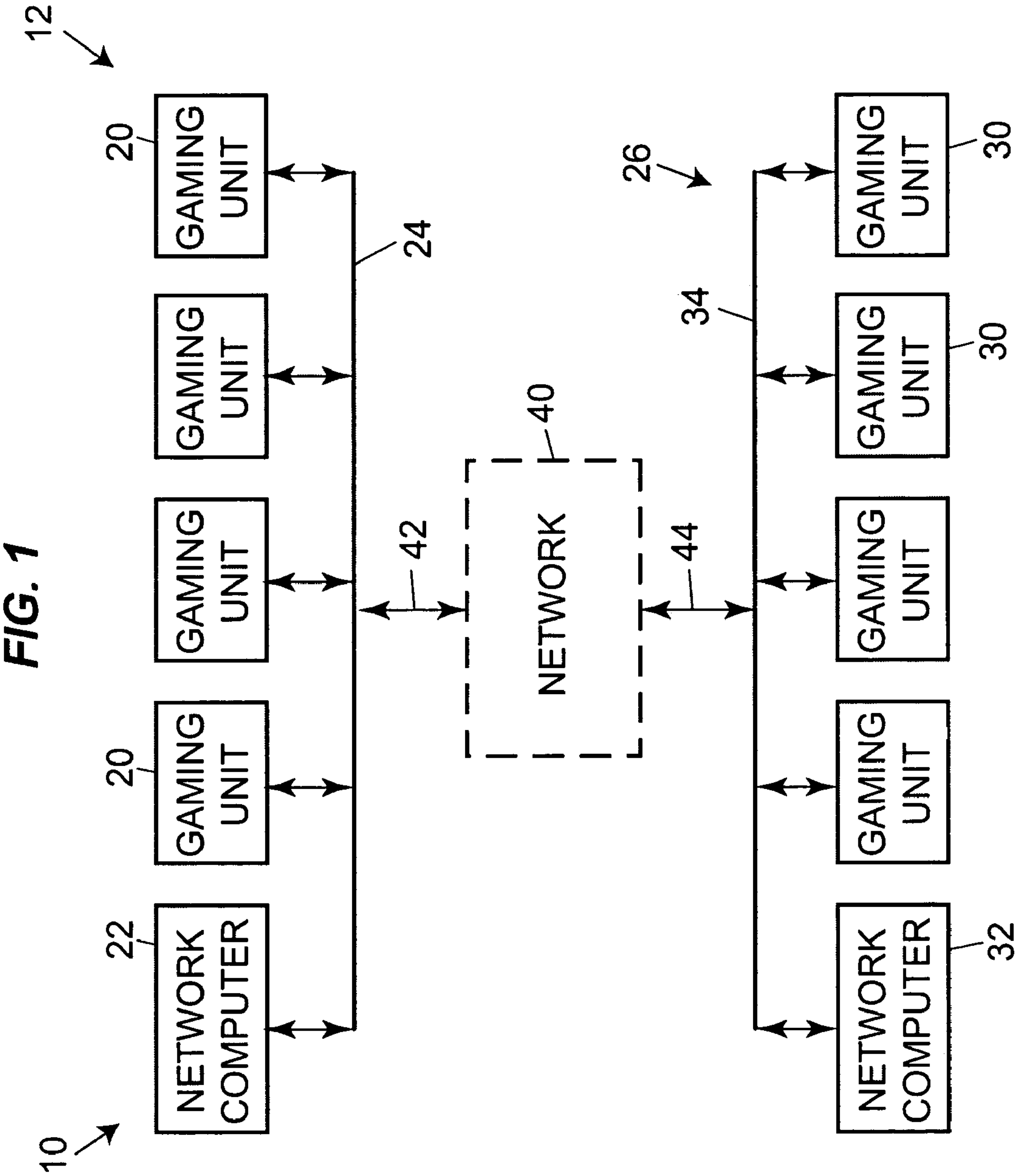
FIG. 1 is a block diagram of an embodiment of a gaming system in accordance with the invention.

FIG. 1 illustrates an embodiment of a gaming system 10 in accordance with the invention. Referring to FIG. 1, the gaming system 10 may include a first group or network 12 of gaming units 20 operatively coupled to a network computer 22 via a network data link or bus 24. The gaming system 10 may include a second group or network 26 of gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second location located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

Figure 2:
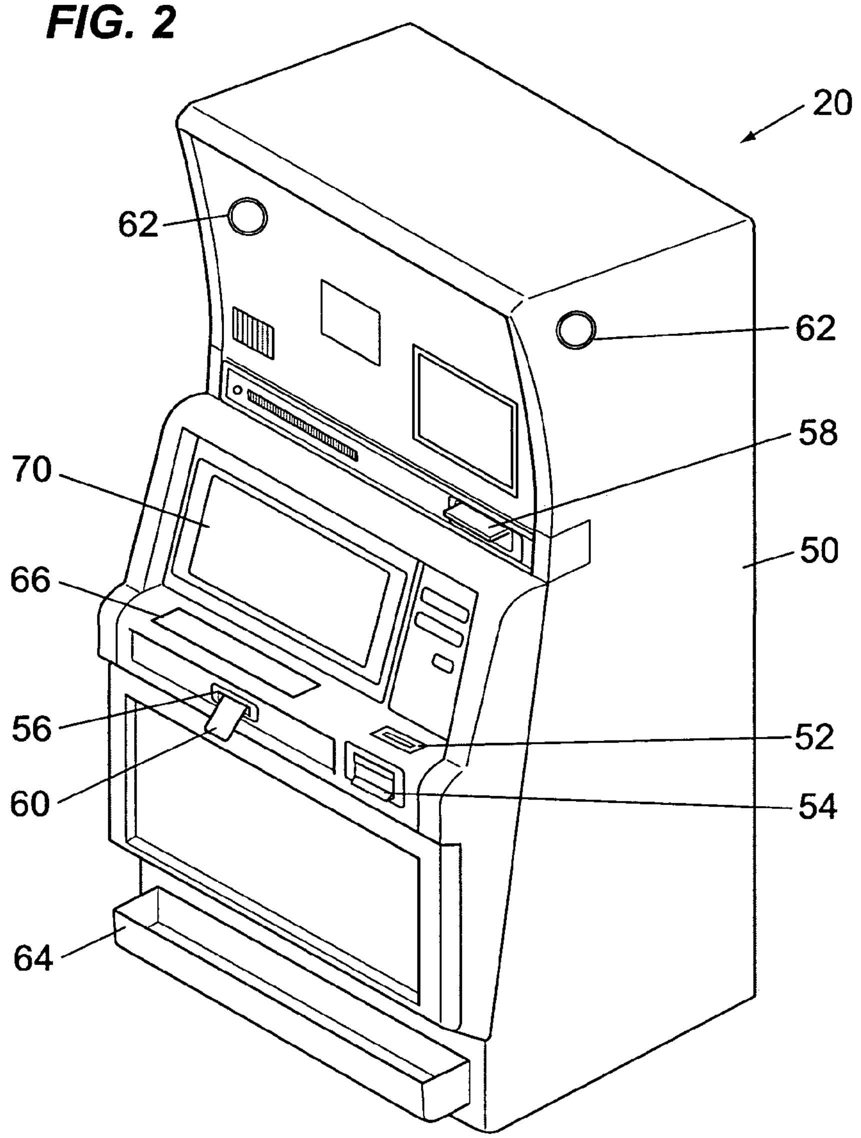
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of gaming unit and may have various different structures and methods of operation. For exemplary purposes, various designs of the gaming units 20 are described below, but it should be understood that numerous other designs may be utilized.

Referring to FIG. 2, the gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the location name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and a color video display unit 70 for displaying images relating to the game or games provided by the gaming unit 20. The audio speakers 62 may generate audio representing sounds such as the noise of spinning slot machine reels, a dealer's voice, music, announcements or any other audio related to a game. The input control panel 66 may be provided with a plurality of pushbuttons or touch-sensitive areas that may be pressed by a player to select games, make wagers, make gaming decisions, etc.

Figure 2A:
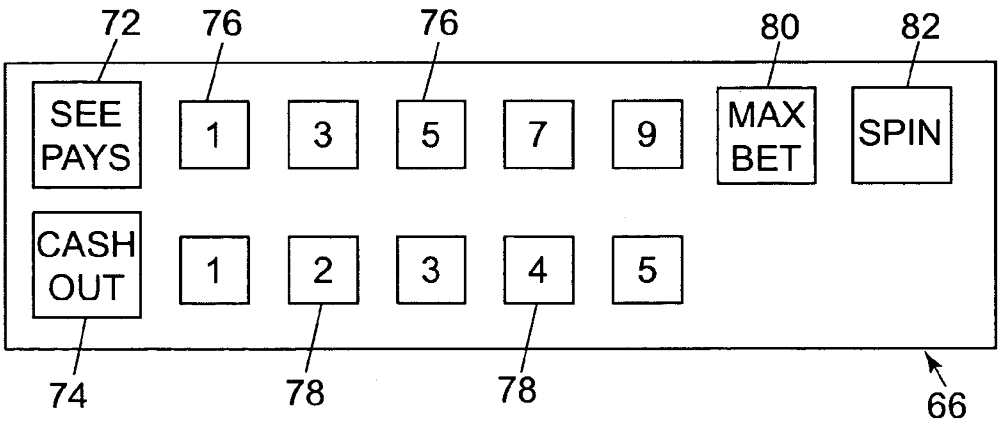
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
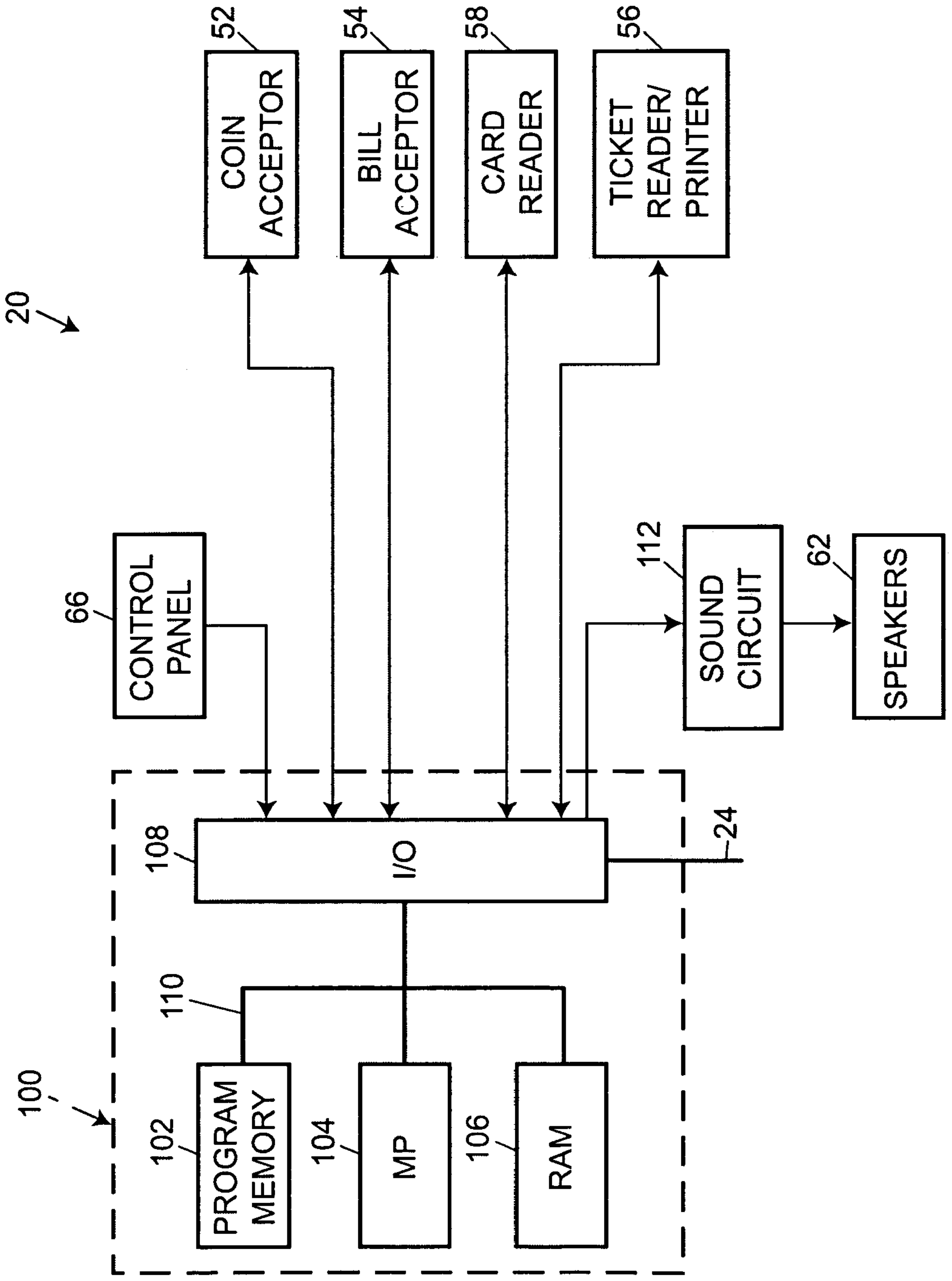
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 106 and program memories 102 may be implemented as semiconductor memories, magnetically readable memories, and/or optically readable memories, for example.

FIG. 3 illustrates that the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C+, C++ or the like or any low-level, assembly or machine language. By storing the computer program portions therein, various portions of the memories 102, 106 are physically and/or structurally configured in accordance with computer program instructions.

Figure 4:
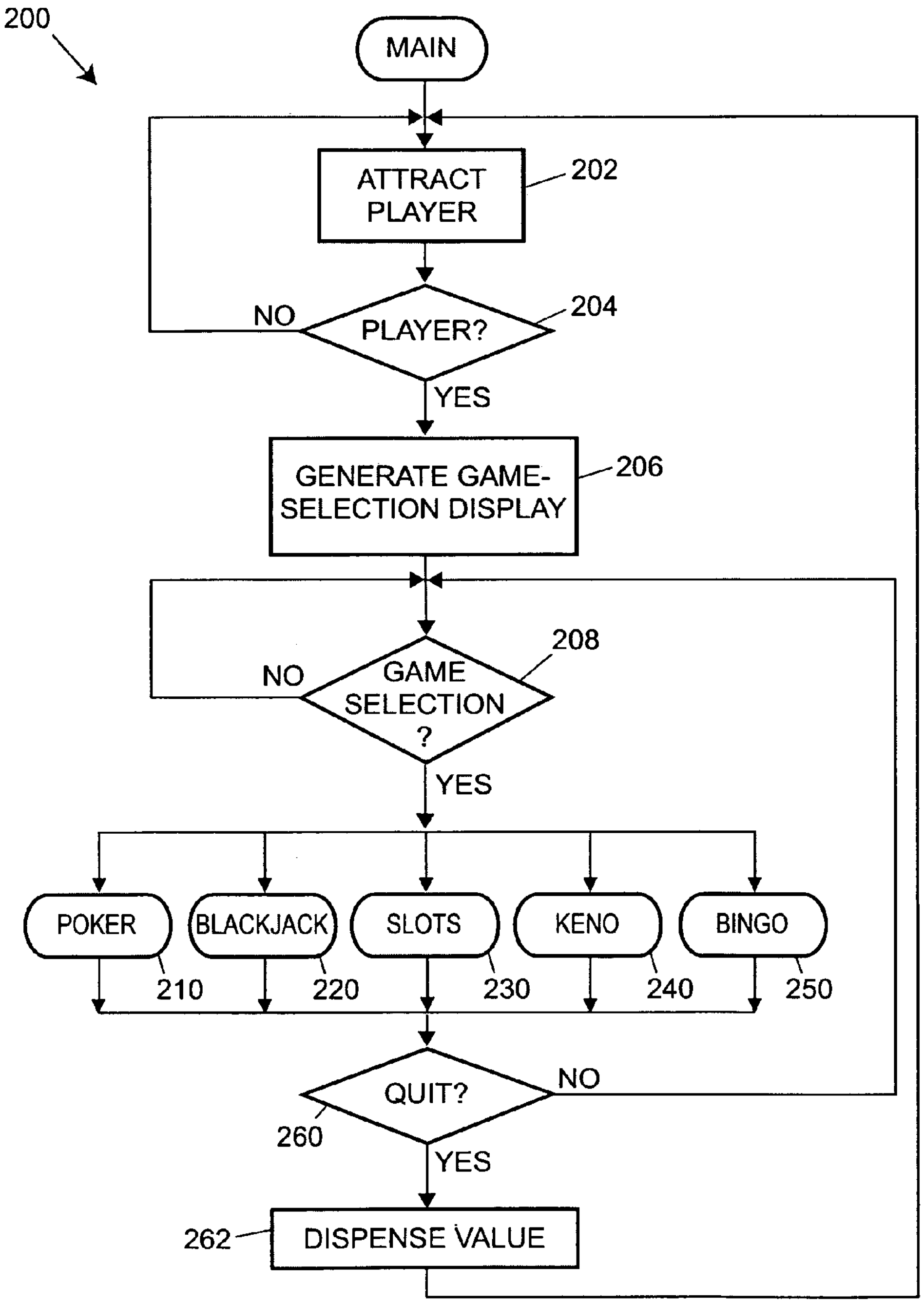
FIG. 4 is a flowchart of an embodiment of a main routine that may be performed during operation of one or more of the gaming units.

FIG. 4 is a flowchart of a main operating routine 200 that may be stored in the memory of the controller 100. Referring to FIG. 4, the main routine 200 may begin operation at block 202 during which an attraction sequence may be performed in an attempt to induce a potential player to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 70 at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the p layer did not wish to quit as determined at block 260, the routine may return to block 208 where the game-selection display may again be generated to allow the player to select another game.

It should be noted that although five gaming routines are shown in FIG. 4, a different number of routines could be included to allow play of a different number of games. The gaming unit 20 may also be programmed to allow play of different games.

Figure 5:
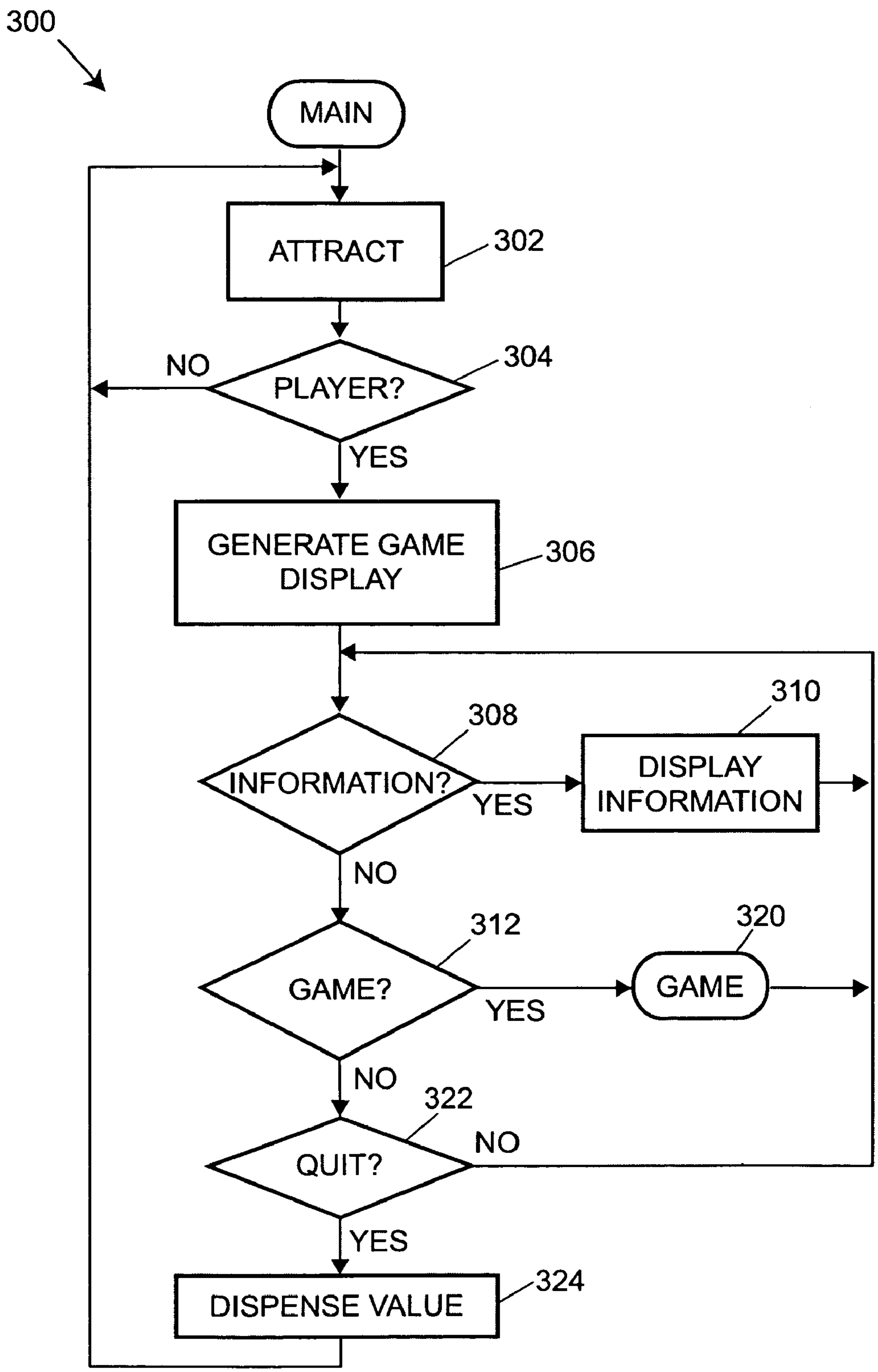
FIG. 5 is a flowchart of an alternative embodiment of a main routine that may be performed during operation of one or more of the gaming units.

FIG. 5 is a flowchart of an alternative main operating routine 300 that may be stored in the memory of the controller 100. The main routine 300 may be utilized for gaming units 20 that are designed to allow play of only a single game or single type of game. Referring to FIG. 5, the main routine 300 may begin operation at block 302 during which an attraction sequence may be performed in an attempt to induce a potential player to play the gaming unit 20. The attraction sequence may be performed by displaying one or more video images on the display unit 70 and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 70 at block 306. The game display generated at block 306 may include, for example, an image of the game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Video Poker

Figure 6:
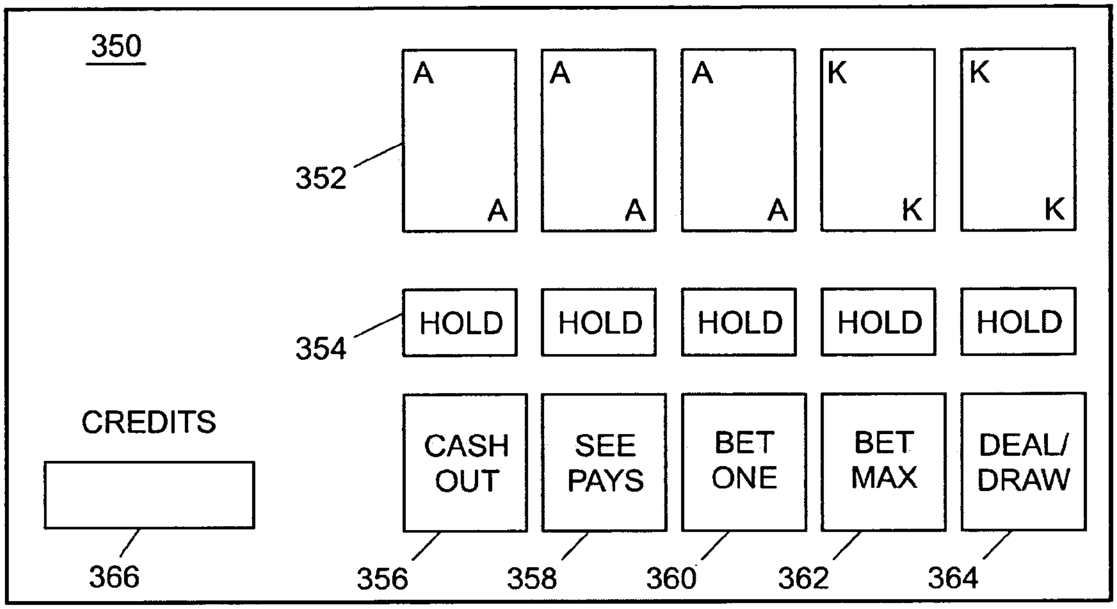
FIG. 6 is an illustration of an embodiment of a visual display that may be displayed during performance of the video poker routine of FIG. 8.

FIG. 6 is an exemplary display 350 that may be shown on the display unit 70 during performance of the video poker routine 210 shown schematically in FIG. 4. Referring to FIG. 6, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 8:
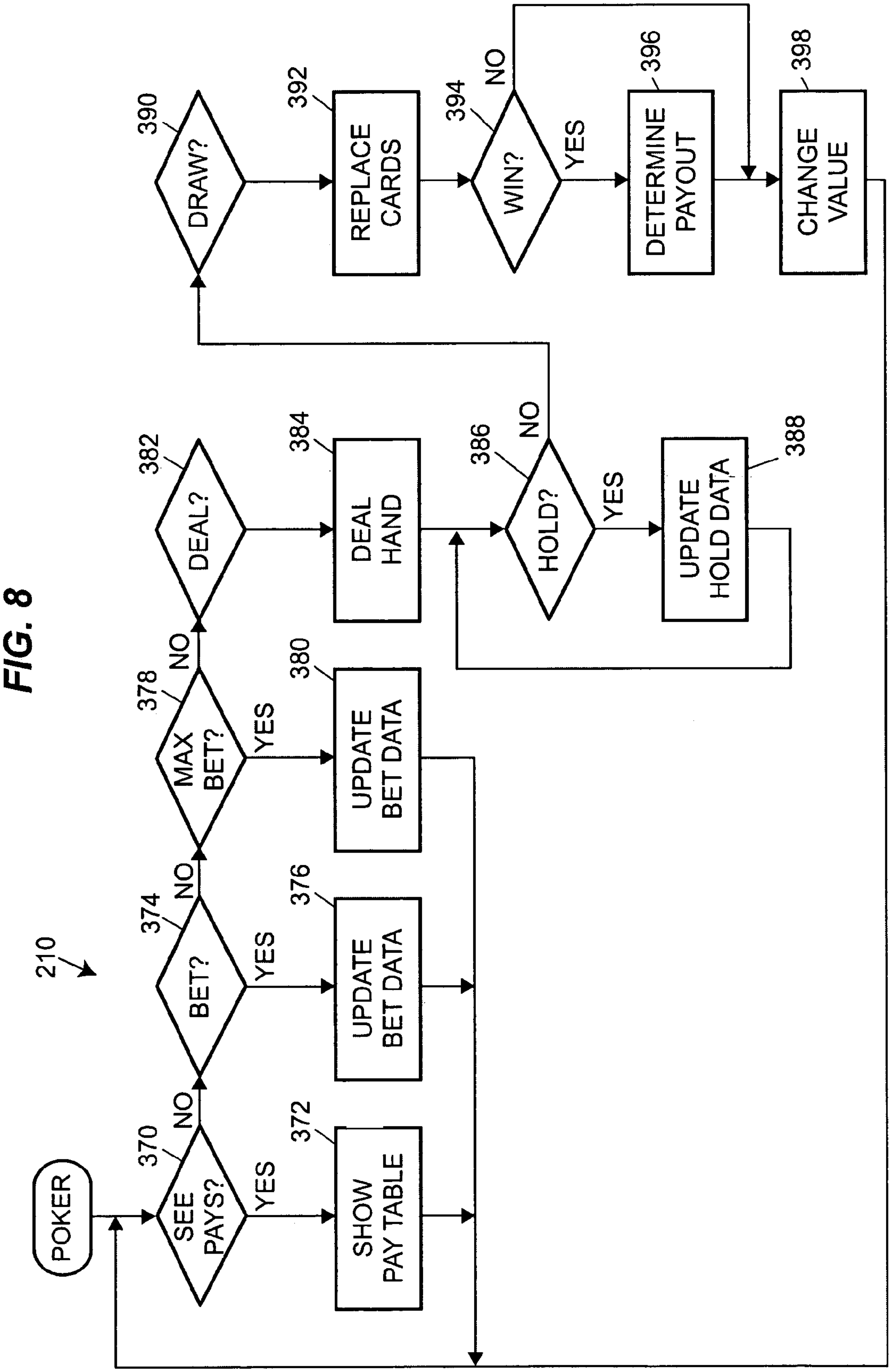
FIG. 8 is a flowchart of an embodiment of a video poker routine that may be performed by one or more of the gaming units.

FIG. 8 is a flowchart of the video poker routine 210 shown schematically in FIG. 4. Referring to FIG. 8, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 7:
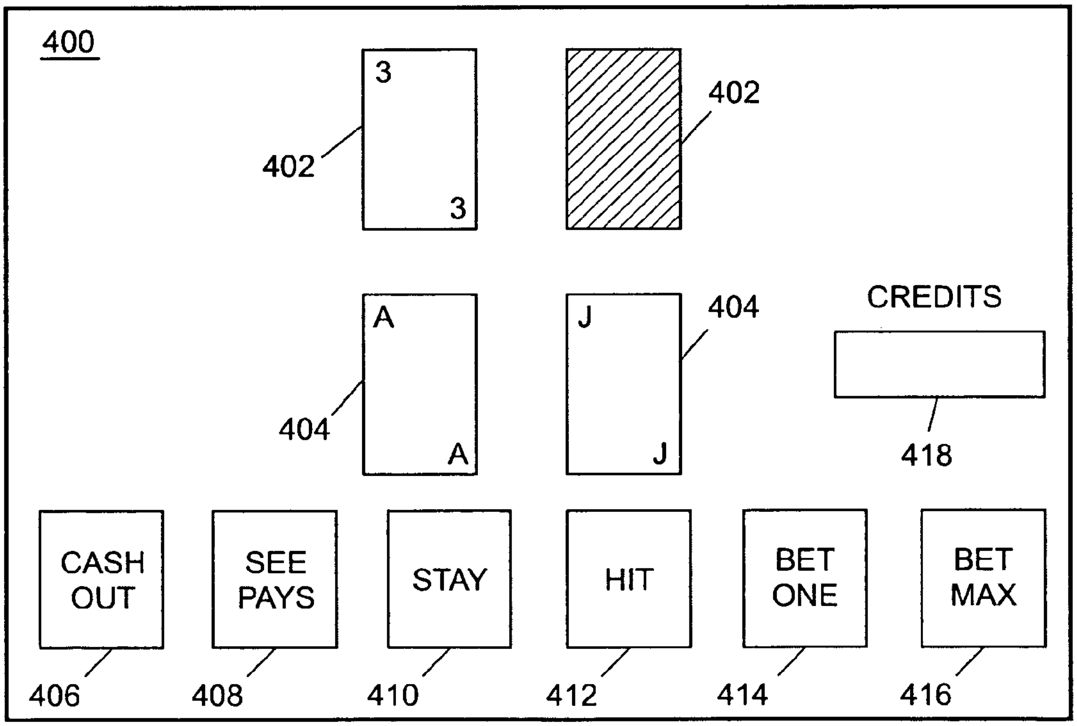
FIG. 7 is an illustration of an embodiment of a visual display that may be displayed during performance of the video blackjack routine of FIG. 9.

FIG. 7 is an exemplary display 400 that may be shown on the display unit 70 during performance of the video blackjack routine 220 shown schematically in FIG. 4. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 9:
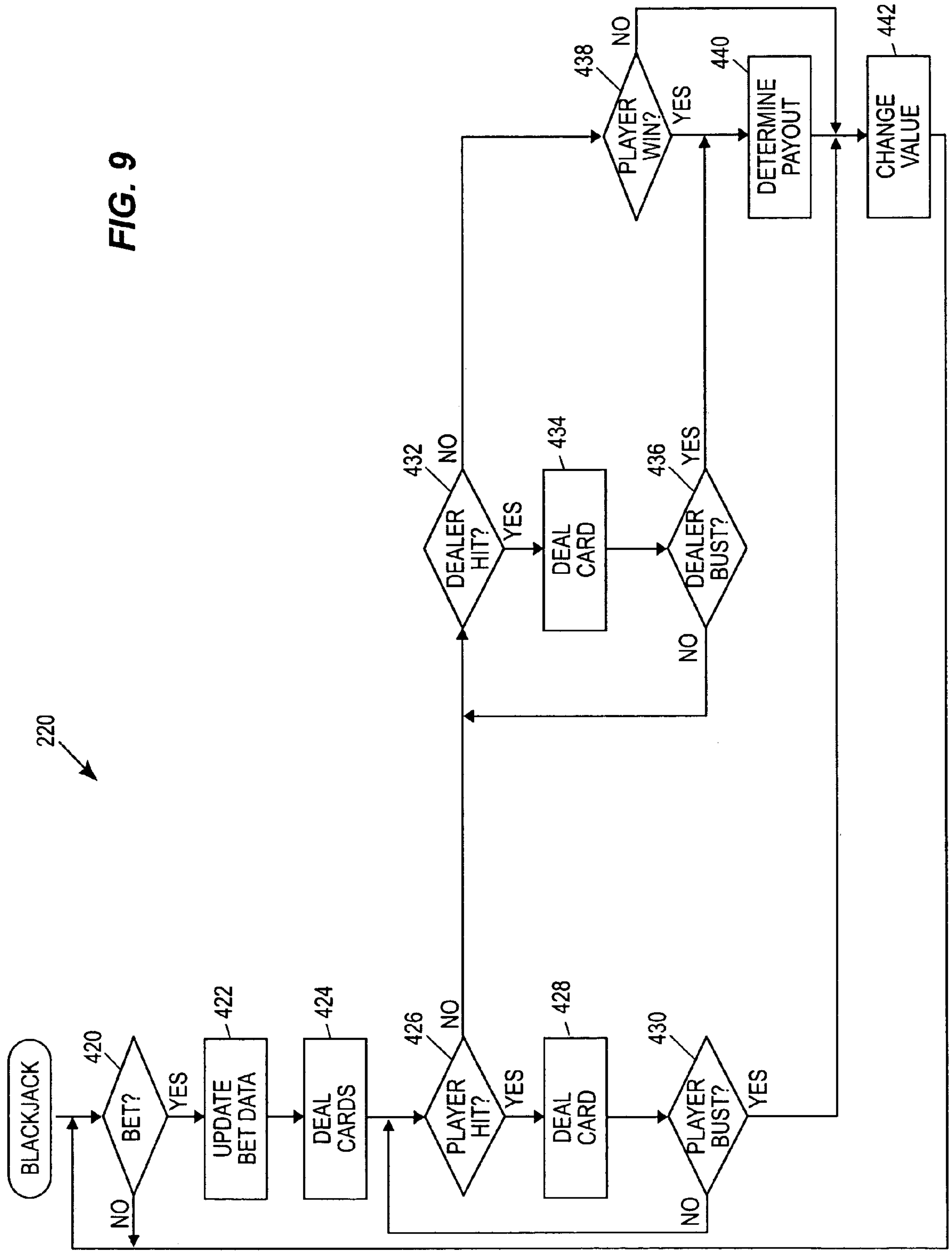
FIG. 9 is a flowchart of an embodiment of a video blackjack routine that may be performed by one or more of the gaming units.

FIG. 9 is a flowchart of the video blackjack routine 220 shown schematically in FIG. 4. Referring to FIG. 9, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 396. The cumulative value or number of credits may also be displayed in the display area 418 (FIG. 7).

Slots

Figure 10:
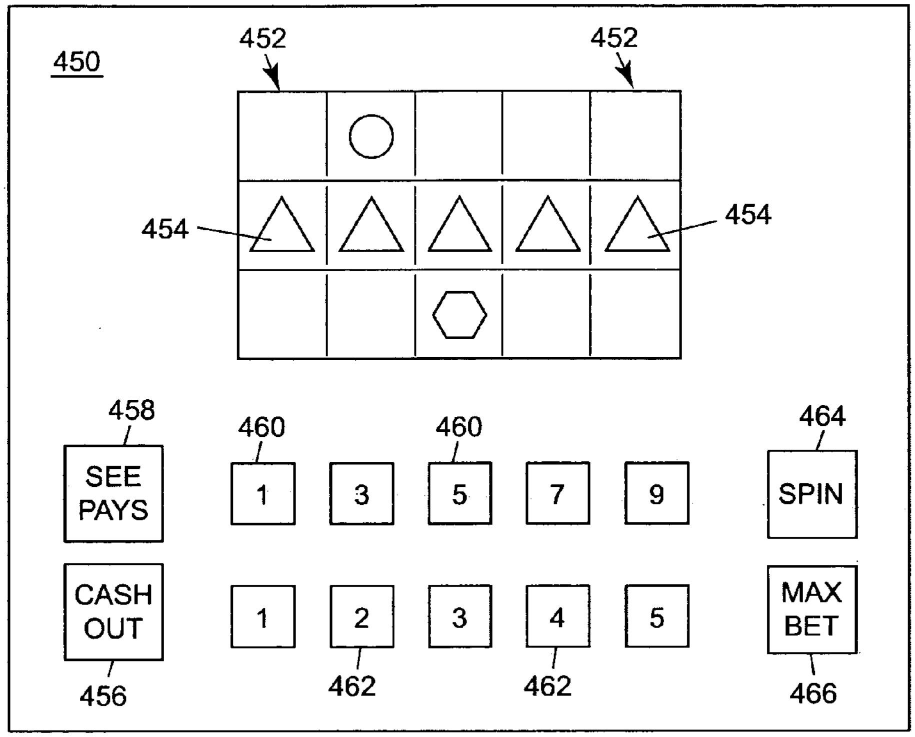
FIG. 10 is an illustration of an embodiment of a visual display that may be displayed during performance of the slots routine of FIG. 12.

FIG. 10 is an exemplary display 450 that may be shown on the display unit 70 during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 12:
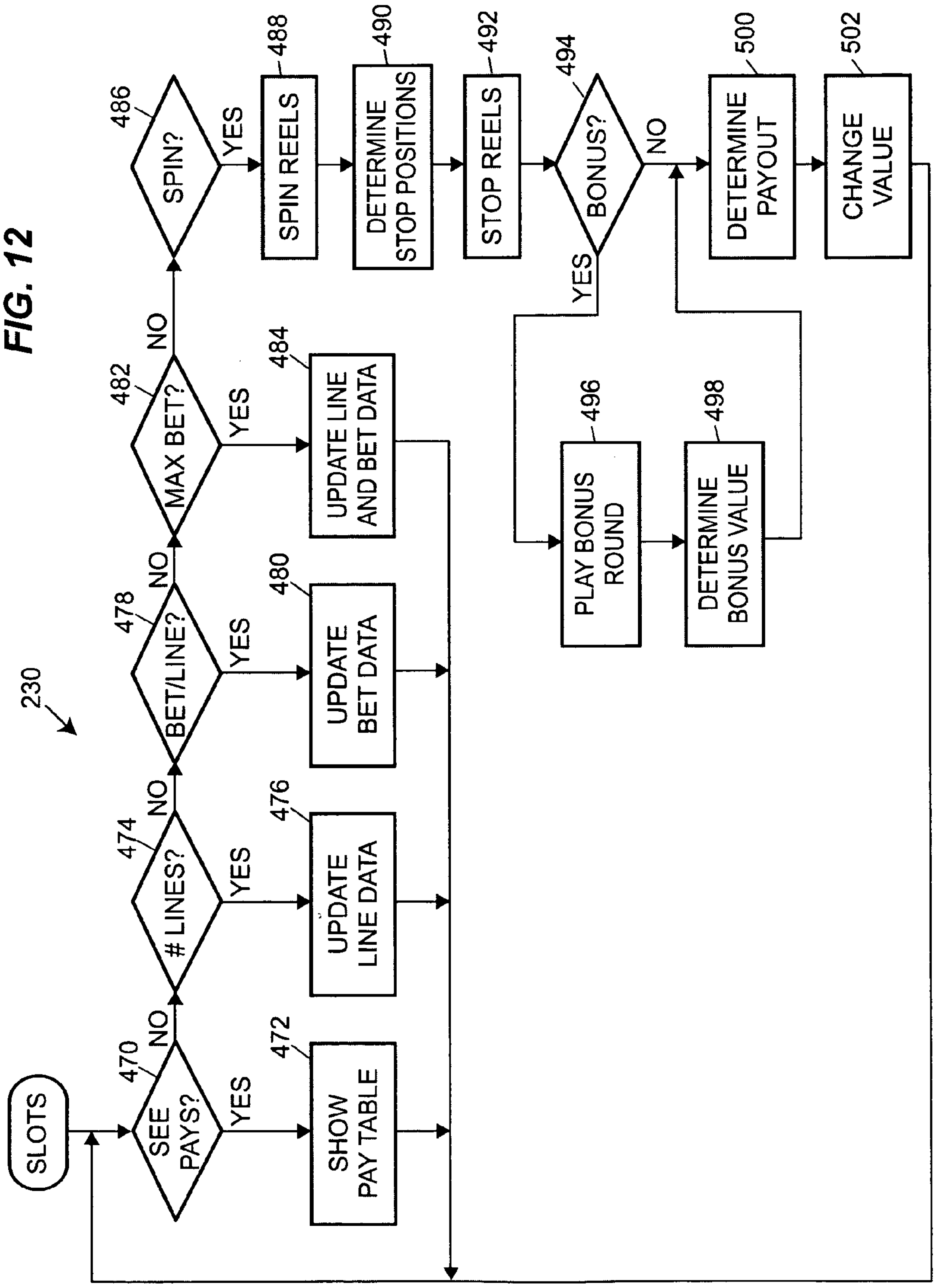
FIG. 12 is a flowchart of an embodiment of a slots routine that may be performed by one or more of the gaming units.

FIG. 12 is a flowchart of the slots routine 230 shown schematically in FIG. 10. Referring to FIG. 12, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spining" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

Figure 11:
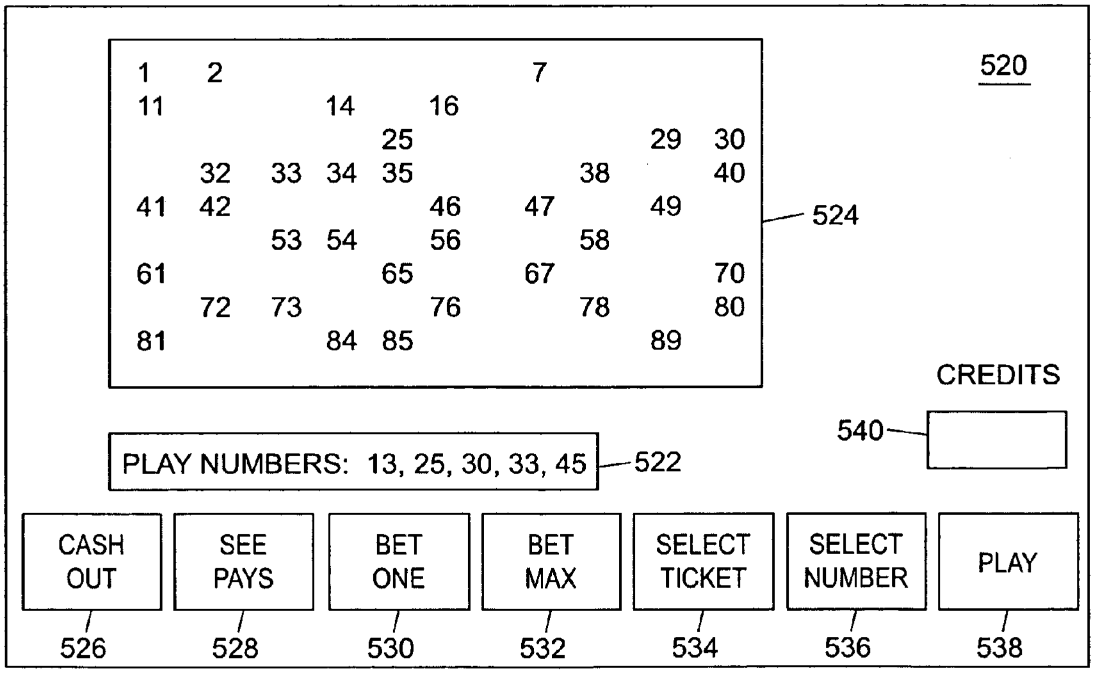
FIG. 11 is an illustration of an embodiment of a visual display that may be displayed during performance of the video keno routine of FIG. 13.

FIG. 11 is an exemplary display 520 that may be shown on the display unit 70 during performance of the video keno routine 240 shown schematically in FIG. 4. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 13:
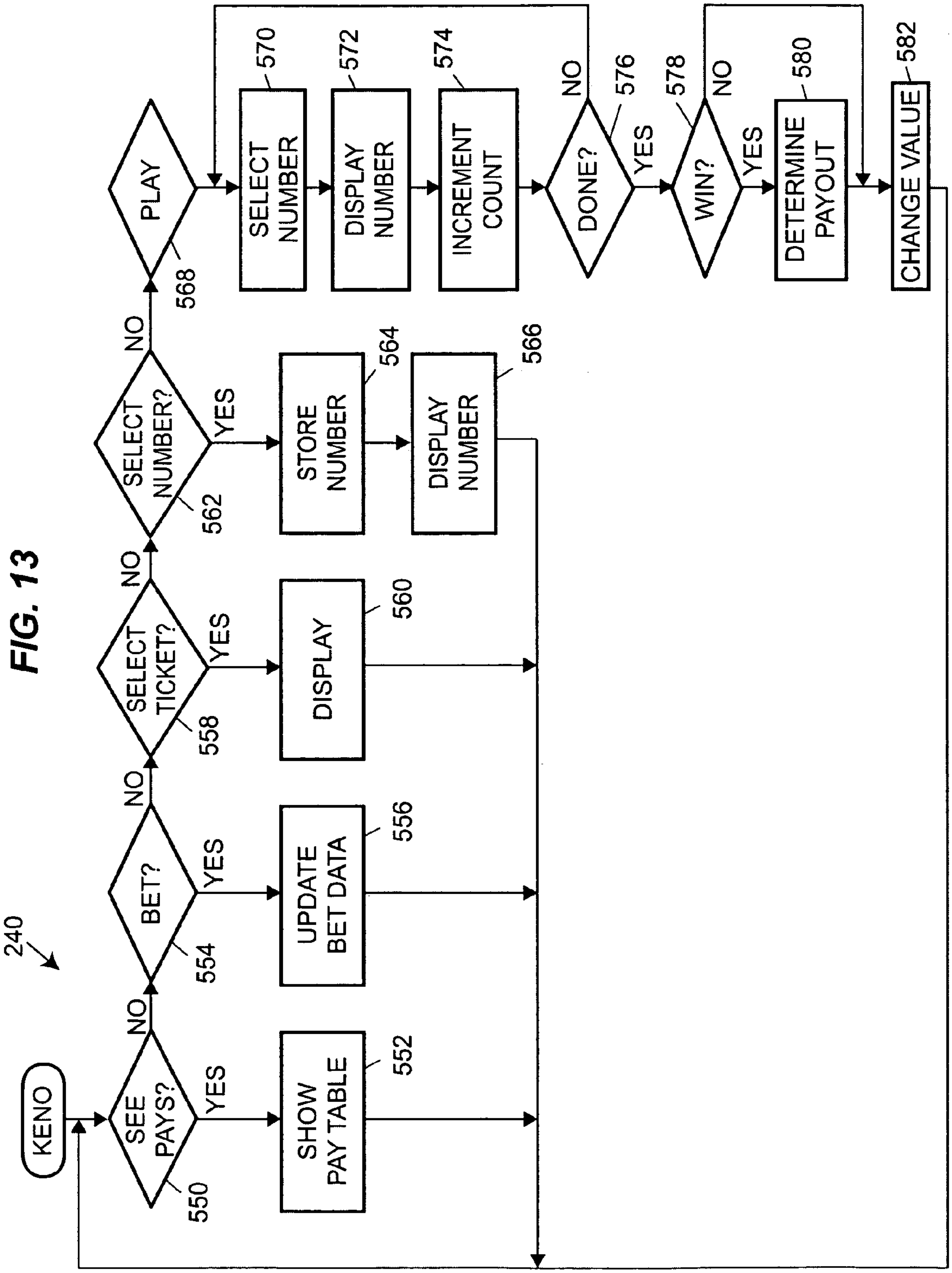
FIG. 13 is a flowchart of an embodiment of a video keno routine that may be performed by one or more of the gaming units.

FIG. 13 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 13, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the game provider may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 11).

Video Bingo

Figure 14:
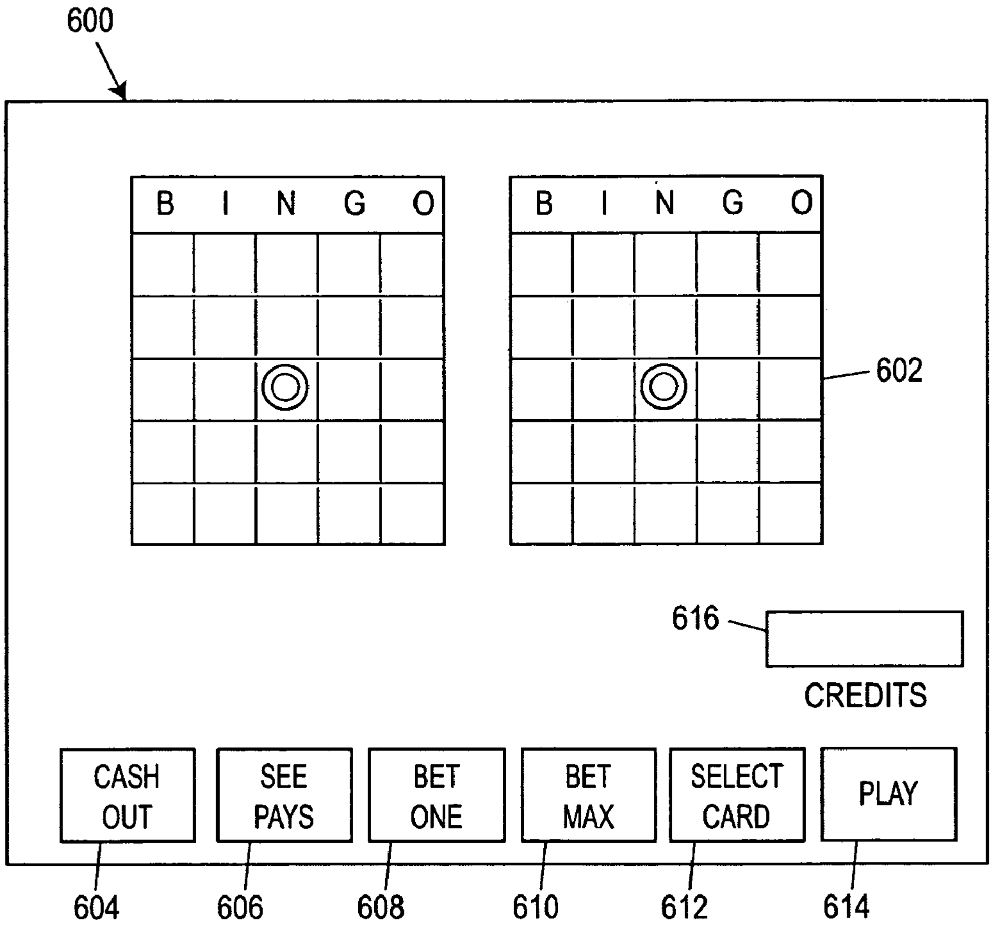
FIG. 14 is an illustration of an embodiment of a visual display that may be displayed during performance of the video bingo routine of FIG. 15.

FIG. 14 is an exemplary display 600 that may be shown on the display unit 70 during performance of the video bingo routine 250 shown schematically in FIG. 4. Referring to FIG. 14, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 15:
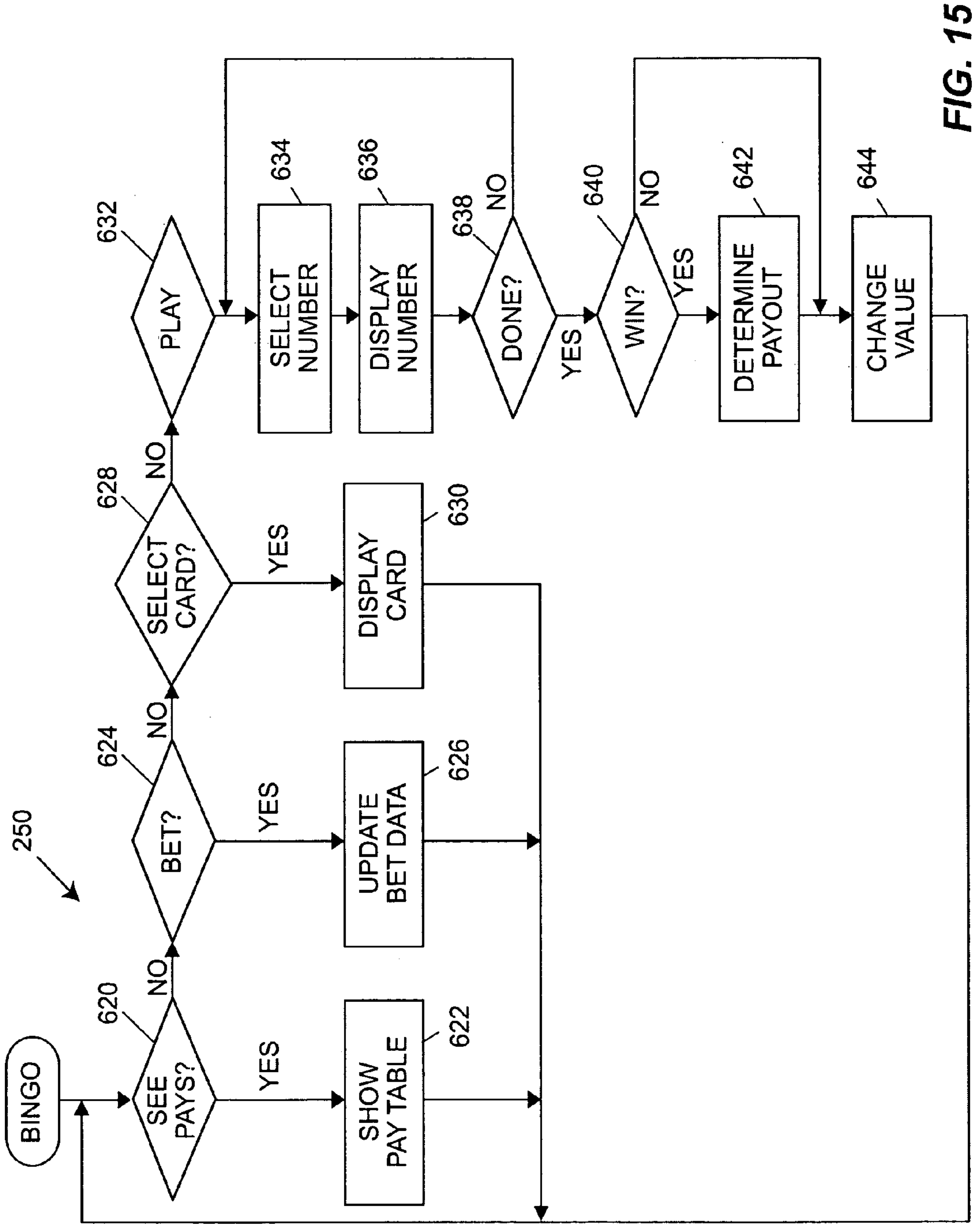
FIG. 15 is a flowchart of an embodiment of a video bingo routine that may be performed by one or more of the gaming units.

FIG. 15 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 15, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 14).

Novel Display Technique

Figure 16:
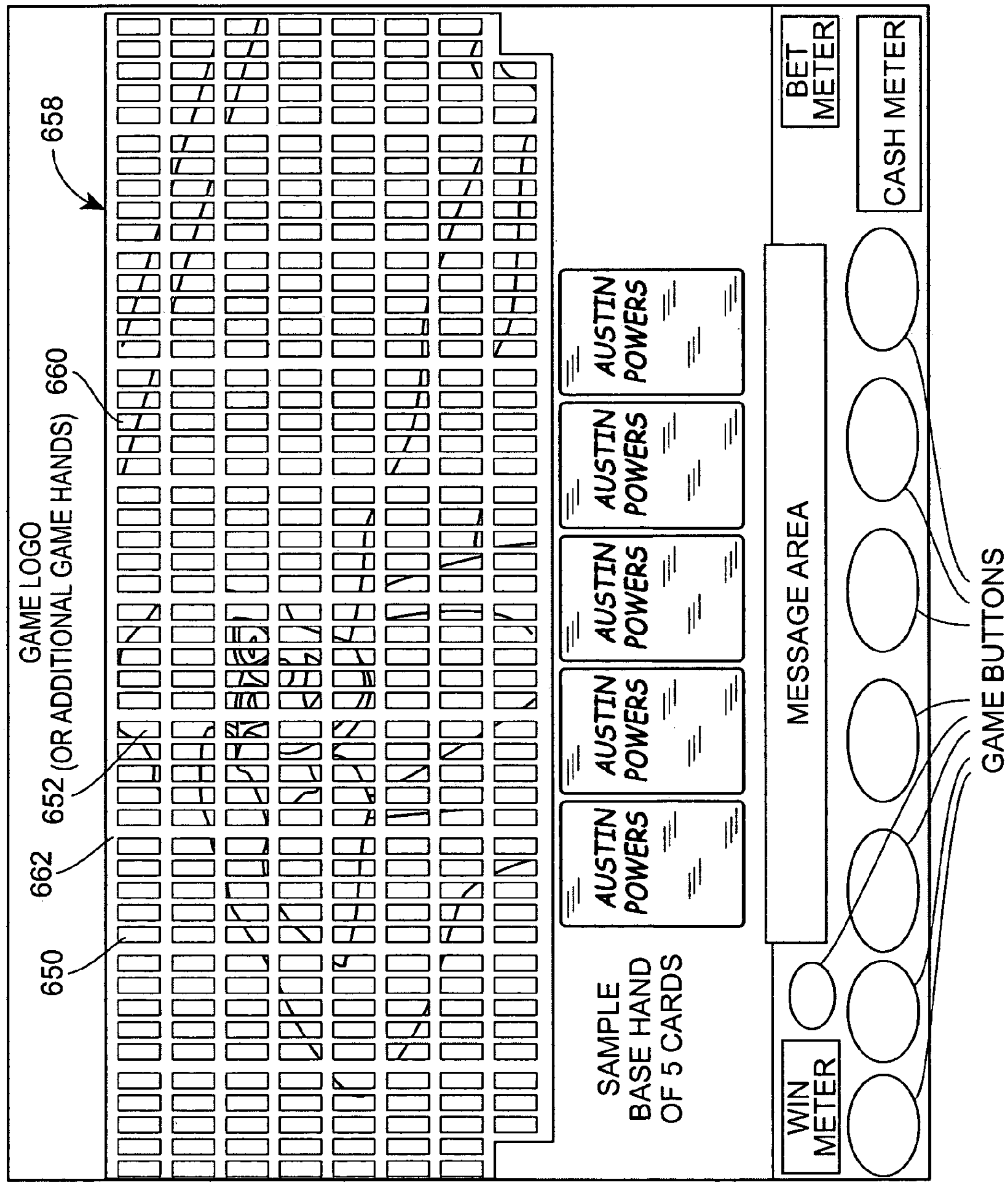
FIG. 16 is an illustration of a visual display that may be displayed when one or more of the gaming units performs the novel display technique.

FIG. 16 illustrates a novel display technique that may be utilized on the display unit 70. The display technique may be used with any game such as video poker, blackjack, slots, keno and bingo. The novel display technique may display a plurality of display elements 650 which may be portions 652 of a display object 654. The display object 654 may be a single picture, an illustration or a plurality of pictures or illustrations. The display object 654 also may be a moving picture or illustration. The display object 654 may be made up of a plurality of pixels 656. For example, a technique display 658 may be made up of 48,000 pixels 656 (600 horizontal lines of pixels by 800 vertical lines of pixels) which may be part or the entire display of the display unit 70.

Figure 16A:
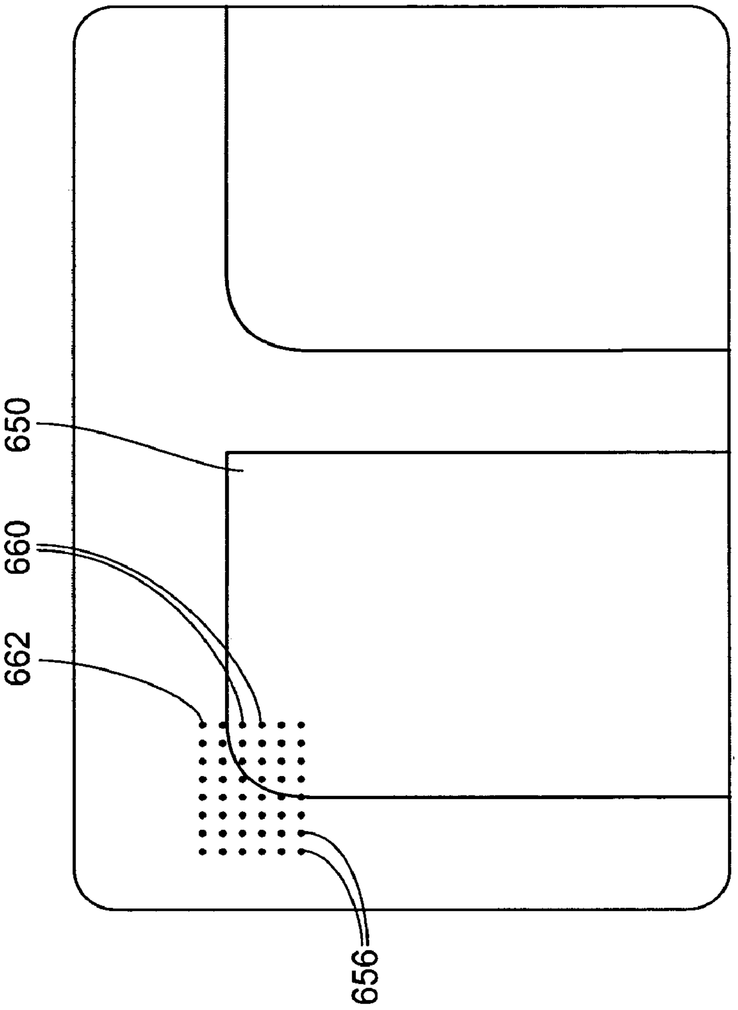
FIG. 16*a* is an illustration of a portion of a visual display that may be displayed when one or more of the gaming units performs the novel display technique.

Referring to FIG. 16*a*, the controller 100 may separate the pixels 656 on the technique display 658 among display element pixels 660 and outline pixels 662. The controller 100 may create a display which is stored in the memory 106 in which the display object 654 is mapped on all of the pixels 656 and the controller 100 may overlay outline pixels 662 on a previously stored list of outline pixels 662. The outline pixels 662 may be one color such as black. The areas of the display object 654 which are not outline pixels 662 may be stored in the memory 106 as display element pixels 660 and make up display elements 650. As a result, when the controller 100 maps the display from the memory 106 on the display unit 70, portions 652 of the display object 654 may be displayed in the display element pixels 660 as display elements 650 surrounded by the darkened outline pixels 662 which do not display the first display object 654. Accordingly, the display object 654 may have the outline of individual display elements 650 (as defined by the outline pixels 662) displayed over the original display object 654. In addition, the display object 654 may be identifiable or recognizable as being a picture or illustration even with the darkened outline pixels 662 creating the image that first display object 654 has been cut into portions 652.

Referring again to FIG. 16, the plurality of display elements 650 may also be displayed as being illustrations of individual playing cards 664 with card fronts 668 and card backs 670 used in the game. The plurality of virtual playing cards 664 may be outlined with the outline pixels 662 to illustrate a separation of the individual playing cards 664. In addition, the display of the plurality of the display elements 650 may be accomplished in a progressive manner. For example, the controller 100 may progressively change the display elements 650 from displaying card backs 670 to display portions 652 of the first display object 654 while the outline pixels 662 do not change.

The progression can also change from displaying the display pixels 660 of the display object 654 in the display elements 650 to displaying a second display object 672 in the display elements 650. The second display object 672 may be card backs 670, card fronts 668 or any other picture or image including the portions 652 of the display object 654.

Figure 17:
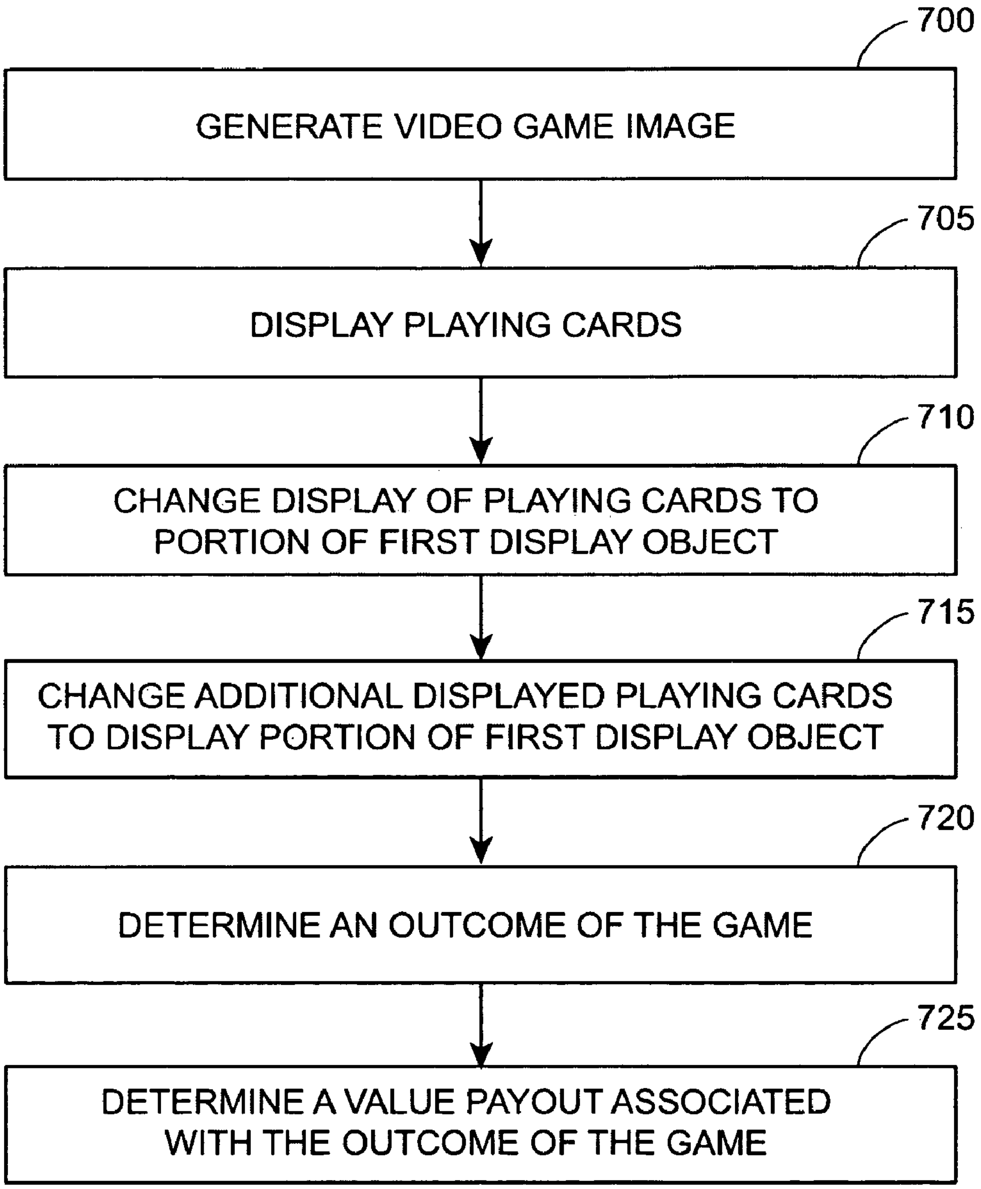
FIG. 17 is a flowchart of a display technique routine that may be performed by one or more of the gaming units.

FIG. 17 is an illustration of a method that may be executed to implement the change from displaying in the display elements 650 the portion 652 of the display object 654 to displaying the second display object 672 or from displaying the second display object 672 to displaying the portion 652 of the display object 654. The display technique may be stored as a routine in the memory 106 and may be executed by the controller 100.

At block 700, a video game image may be generated where the video game image may represent a game such as video poker or video blackjack. As previously explained, other games also could be part of the method. The video game image may be an image of a plurality of playing cards, keno number space, bingo number spaces and the like. At block 705, a plurality of playing cards may be displayed where the playing cards having card fronts and card backs. In addition, keno number spaces, bingo number spaces and the like may be displayed. At block 710, the display may change from displaying the playing cards or the like to displaying a portion of a display object where the portions of the display object create an identifiable display object. For example, portions of a picture of Austin Powers may be displayed inside the displayed cards creating an identifiable picture of Austin Powers. A block 715 may change additional playing cards or the like to display portions of the display object 654. The change may be from displaying the portion 652 of the display object 654 to displaying the second display objects 672 or from displaying the second display objects 672 to displaying the portion 652 of the display object 654. The progression of the change of the display elements 650 can occur in any manner. For example, the progression of the change of the display elements 650 can occur from left to right, from top to bottom, in a random fashion or in any other manner which may be found attractive to potential users. In addition, specific games may allow for additional variations. For example, if the player is playing multi-hand poker, the controller 100 may cause the first card 664 in each hand to change from displaying a card front 668 to displaying the portion 652 of the display object 654 and then the second card 664 in each hand may change in a similar manner. The change of the display elements 650 will be of a speed that players will be able to track the progression of the change of the display elements 650. At block 720, an outcome of the game represented by the video game image may be determined. At block 725, a value payout associated with the outcome of the game may be determined.

Figure 18:
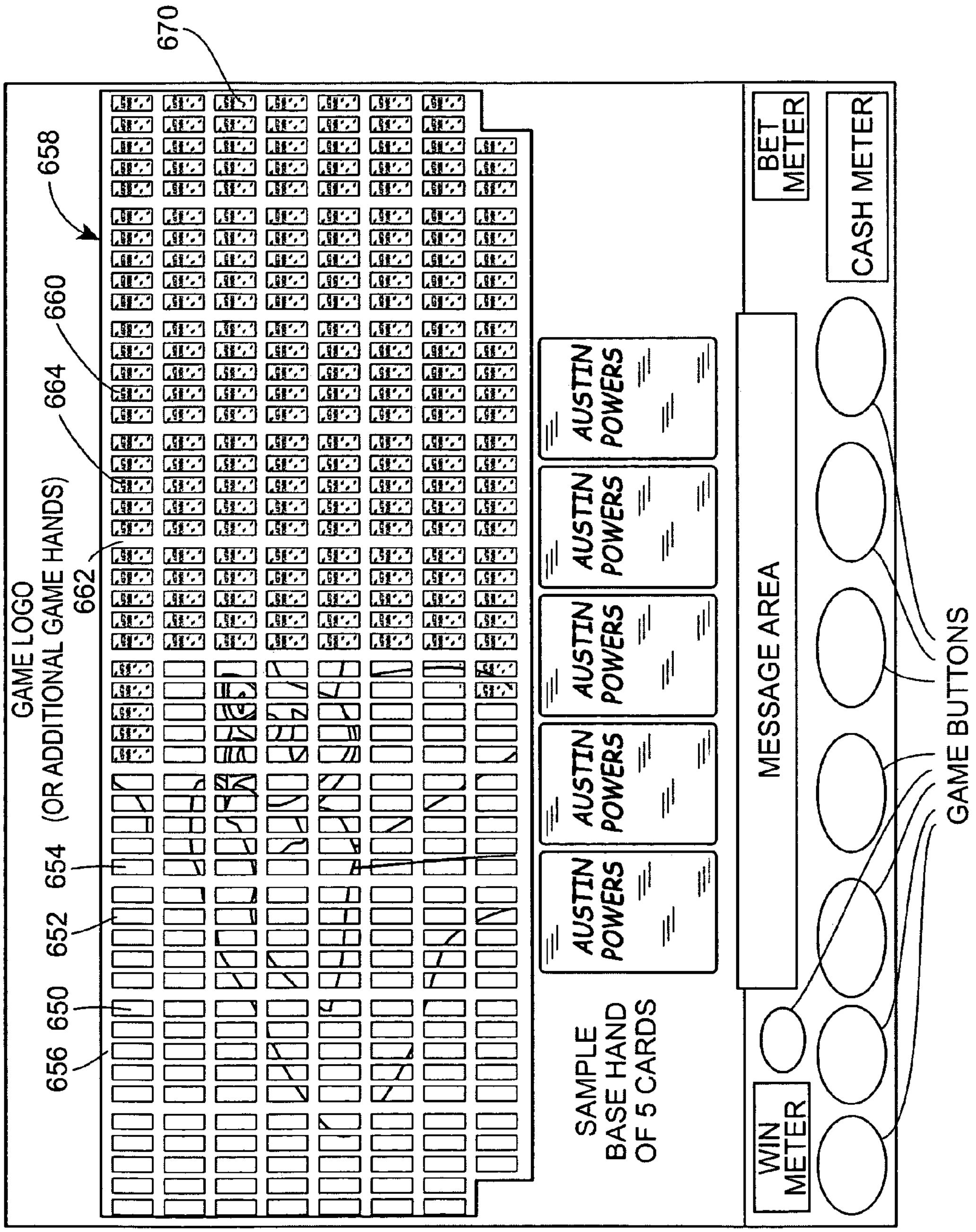
FIG. 18 is an illustration of a visual display that may be displayed when one or more of the gaming units performs the novel display technique.
Figure 19:
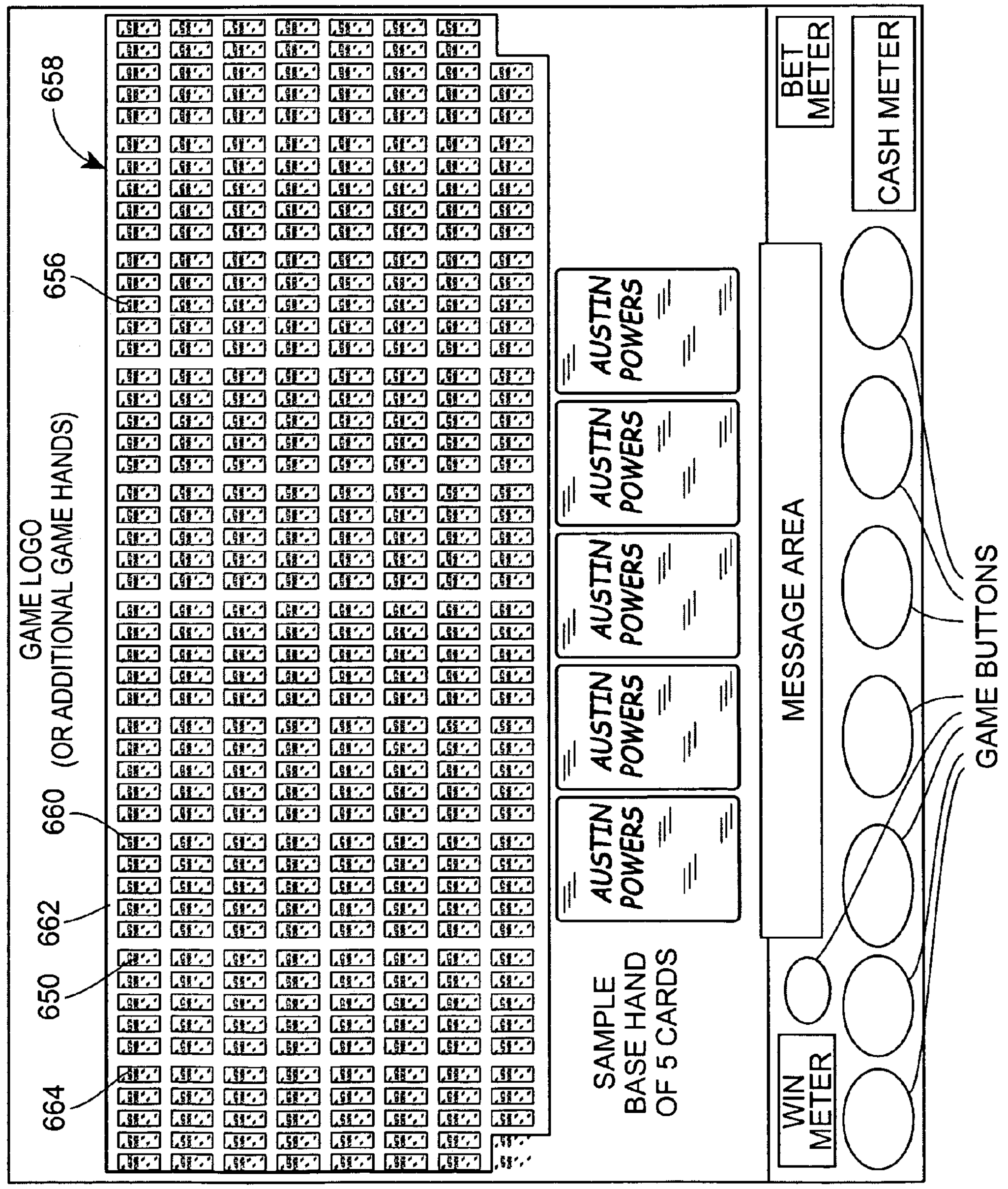
FIG. 19 is an illustration of a visual display that may be displayed when one or more of the gaming units performs the novel display technique.

Referring to FIG. 16, as an example, the display object 654 may be the picture of Austin Powers and the second display object 672 may be card backs 670. Initially, all the display elements 650 may display portions 652 of the display object 654 which may be, for example, a picture of Austin Powers. Even though the outline pixels 662 are dark, the display object 654 is still recognizable. The controller 100 may determine that the game should enter the attract mode and may begin the display technique. The controller 100 may change a percentage, for example, the left most ten percent of the previously unchanged display elements 650 from displaying the card backs 670 to displaying the portion 652 of the display object 654 (in the display pixels 660) which may be, for example, a picture of Austin Powers. In FIG. 18, several display elements 650, which are virtual playing cards 664 in this example, change from displaying the portion of the display object 654 to displaying the second display object 672 which may be card backs 670 or card fronts 668 (not shown). The controller may determine whether a user has been attracted. If a user has been attracted, the display technique may end. If no user has been attracted, the display technique may continue. FIG. 19 illustrates an example where the method may have completed and all the display elements 650 display the second display objects 672 which may be card backs 670 or card fronts 668 (not shown). Of course, the display technique may change the display elements 650 from displaying the second display objects 664 to displaying portions 652 of the display object 654.

The unique display technique can be applied to virtually any video game. For example, in blackjack, a series of virtual playing cards 664 can change from displaying either the card front 668 or card back 670 to displaying the portion 652 of the display object 654 in the display elements 650. As another example, in keno, a keno display may be made up of a plurality of keno number spaces with each keno number space displaying a keno number if that keno number is selected. Similar to the previous example, the keno number spaces may be outlined with the outline pixels 662 and the outline pixels 662 may be stored in the memory 106. In the non-outline pixels or display element pixels 660, portions 652 of the display object 654 may be displayed in the display elements 650 with the outline pixels 662 outlining the display elements 650 over the display object 654. The controller 100 may cause the display elements 650 to change from displaying portions 652 of the display object 654 to display the second display objects 672 which may be, for example, the keno numbers assigned to each keno number space. The display technique also may cause the display elements 650 to change from being blank to displaying portions 652 of the display object 654 or from displaying keno numbers to displaying portions 652 of the display object 654.

The display technique also may be applied to video bingo. In video bingo, a plurality of bingo cards may be displayed with the bingo cards having a plurality of squares for bingo numbers. The actual bingo cards may be used as display elements 650 or the individual bingo squares may be used as display elements 650. Using the individual bingo squares as the display elements 650, the display technique may outline the squares using an outline list or map of the outline pixels 662 stored in the memory 106 and may change the display elements 650 of the squares to change from displaying bingo numbers to displaying portions 652 of the display object 654. In addition, the displaying of the portions 652 of the display object 654 may change from displaying portions 652 of the display object 654 to displaying bingo numbers or being blank.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A gaming apparatus, comprising:

a cabinet having a front face;

a gaming display supported inside the cabinet and positioned adjacent the cabinet front face, the gaming display being operable to generate images; and a controller operatively coupled to the gaming display, the controller comprising a processor and a memory operatively coupled to the processor, the controller being programmed to allow a person to make a wager, the controller being programmed to cause an image associated with a game to be generated on the gaming display, the controller being programmed to determine an outcome of the game represented by the image and to determine a value payout associated with the outcome of the game, and the controller being programmed to display on the gaming display a plurality of playing cards where the playing cards change in a predetermined, non-random sequence at a predetermined speed from displaying one of card backs and card fronts to displaying a portion of a display object inside the playing card spaces wherein said display portions of said display object create a single identifiable composite image.

2. The gaming apparatus as defined in claim 1, in which the controller is programmed to cause the playing cards to progressively change from displaying the portion of the display object to displaying one of the card fronts and the card backs.

3. The gaming apparatus as defined in claim 1, in which the controller is programmed to cause the playing cards to change from displaying one of the card fronts and the card backs to displaying the portion of the display object when the gaming apparatus is in attract mode.

4. The gaming apparatus as defined in claim 1, in which the controller is programmed to cause the gaming display to display a plurality of games.

5. A gaming system comprising a plurality of gaming apparatuses as defined in claim 1, said gaming apparatuses being interconnected to form a network of gaming apparatuses.

6. A gaming system as defined in claim 5, wherein said gaming apparatuses are interconnected via the Internet.

7. A gaming apparatus, comprising:

a cabinet having a front face;

a gaming display supported inside the cabinet and positioned adjacent the cabinet front face, the gaming display being operable to generate images; and a controller operatively coupled to the gaming display, the controller comprising a processor and a memory operatively coupled to the processor, the controller being programmed to allow a person to make a wager, the controller being programmed to cause an image associated with a game to be generated on the gaming display, the controller being programmed to determine an outcome of the game represented by the image and to determine a value payout associated with the outcome of the game, and the controller being programmed to display on the gaming display a plurality of keno number spaces in a keno game where the keno number spaces change in a predetermined, non-random sequence at a predetermined speed from displaying keno numbers to displaying a portion of a display object inside the keno number spaces wherein said display portions of said display object create a single identifiable composite image.

8. The gaming apparatus as defined in claim 7, in which the controller is programmed to cause the keno number spaces to progressively change from displaying the portion of the display object to displaying keno numbers.

9. The gaming apparatus as defined in claim 7, in which the controller is programmed to cause a specific keno number space to change from displaying the portion of the display object to display a specific keno number when the specific keno number is selected by the game.

10. The gaming apparatus as defined in claim 7, in which the controller is programmed to cause the keno number spaces to change from displaying the portion of the display object to displaying keno numbers when the gaming apparatus is in attract mode.

11. The gaming apparatus as defined in claim 7, in which the controller is programmed to cause the gaming display to display a plurality of games.

12. A gaming system, comprising a plurality of gaming apparatuses as defined in claim 7, said gaming apparatuses being interconnected to form a network of gaming apparatuses.

13. A gaming apparatus, comprising:

a cabinet having a front face;

a gaming display supported inside the cabinet and positioned adjacent the cabinet front face, the gaming display being operable to generate images; and a controller operatively coupled to the gaming display, the controller comprising a processor and a memory operatively coupled to the processor, the controller being programmed to allow a person to make a wager, the controller being programmed to cause an image associated with a game to be generated on the gaming display, the controller being programmed to determine an outcome of the game represented by the image and to determine a value payout associated with the outcome of the game, and the controller being programmed to display on the gaming display a plurality of bingo number spaces in a bingo game where the bingo number spaces change in a predetermined, non-random sequence at a predetermined speed from displaying bingo numbers spaces to displaying a portion of a display object inside the bingo number spaces wherein said display portions of said display object create a single identifiable composite image.

14. The gaming apparatus as defined in claim 13, in which the controller is programmed to cause the bingo number spaces to progressively change from displaying the portion of the display object to displaying bingo numbers.

15. The gaming apparatus as defined in claim 13, in which the controller is programmed to cause a specific bingo number space to change from displaying the portion of the display object to display a specific bingo number when the specific bingo number is selected by the game.

16. The gaming apparatus as defined in claim 13, in which the controller is programmed to cause the gaming display to display a plurality of games.

17. A gaming system comprising a plurality of gaming apparatuses as defined in claim 13, said gaming apparatuses being interconnected to form a network of gaming apparatuses.

18. A gaming method comprising:

causing a video game image tote generated, said video game image representing a game selected from the group of games consisting of video poker and video blackjack, said video game image comprising an image of a plurality of playing cards, displaying a plurality of playing cards, the playing cards having card fronts and card backs;

changing a portion of the playing cards from displaying a portion of playing cards to displaying a portion of a display object inside the playing card spaces wherein said display portions of said display object create a single identifiable composite display object;

changing in a predetermined, non-random sequence at a predetermined speed an additional portion of the playing cards from displaying a portion of playing cards to displaying a portion of a display object inside the playing card spaces wherein said display portions of said display object create a single identifiable composite display object;

determining an outcome of said game represented by said video game image; and determining a value payout associated with said outcome of said game.

19. The method of claim 18, further comprising causing the playing cards to progressively change from displaying the portions of the display object to displaying one of the card fronts and the card backs.

20. The method of claim 18, further comprising displaying a plurality of games on the gaming display.

21. A memory having a computer program stored therein, said computer program being capable of being used in connection with a gaming apparatus, said memory comprising:

a first memory portion physically configured in accordance with computer program instructions that would cause the gaming apparatus to allow a person to make a wager;

a second memory portion physically configured in accordance with computer program instructions that would cause the gaming apparatus to cause a video image to be generated on a display unit, said video image representing a game selected from the group of games consisting of video poker and video blackjack, said video image comprising an image of at least five playing cards if said game comprises video poker, said video image comprising an image of a plurality of playing cards if said game comprises video blackjack, a third memory portion physically configured in accordance with computer program instructions that would cause the gaming apparatus to display a plurality of playing cards, the playing cards having card fronts and card backs, a fourth memory portion physically configured in accordance with computer program instructions that would cause the gaming apparatus to change in a predetermined, non-random sequence at a predetermined speed from displaying the playing cards to displaying a portion of a display object inside the playing card spaces wherein said display portions of said display object create a single identifiable composite display object, and a fifth memory portion physically configured in accordance with computer program instructions that would cause the gaming apparatus to determine an outcome of said game represented by said video image and a value payout associated with said outcome of said game.

22. A memory as defined in claim 21, wherein the memory additionally comprises a sixth memory portion physically configured in accordance with computer program instructions that would cause the gaming apparatus to progressively change from displaying the portion of the display object to displaying one of the card fronts and the card backs.

23. A memory as defined in claim 21, wherein the memory additionally comprises a seventh memory portion physically configured in accordance with computer program instructions that would cause the gaming apparatus to progressively change from displaying the portion of the display object to displaying one of the card fronts and the card backs and to cause the gaming apparatus to progressively change from displaying one of the card fronts and card backs to displaying the portion of the display object when the gaming apparatus is in attract mode.

24. A memory as defined in claim 21, wherein the memory additionally comprises an eighth memory portion physically configured in accordance with computer program instructions that would cause the gaming display to display a plurality of games.

* * * * *

UNITED STATES PATENT AND TRADEMARK OFFICE

CERTIFICATE OF CORRECTION

PATENT NO. : 7,097,561 B2
APPLICATION NO. : 09/966479
DATED : August 29, 2006
INVENTOR(S) : David Lark It is certified that error appears in the above-identified patent and that said Letters Patent is hereby corrected as shown below:

Column 18, Claim 18, Line 64, delete “tote” and insert --to be--.

Signed and Sealed this

Twenty-seventh Day of February, 2007

JON W. DUDAS
*Director of the United States Patent and Trademark Office*